United States Patent
Dell'Osa et al.

(10) Patent No.: US 12,536,016 B2
(45) Date of Patent: Jan. 27, 2026

(54) EVALUATION OF SOFTWARE PROGRAMS FOR COMPLIANCE WITH FUNCTIONAL SAFETY

(71) Applicant: Intel Corporation, Santa Clara, CA (US)

(72) Inventors: Stefano Dell'Osa, Pescara (IT); Maurizio Iacaruso, Lucca (IT); Roberto Paccapeli, Rome (IT)

(73) Assignee: Intel Corporation, Santa Clara, CA (US)

( * ) Notice: Subject to any disclaimer, the term of this patent is extended or adjusted under 35 U.S.C. 154(b) by 794 days.

(21) Appl. No.: 17/704,019

(22) Filed: Mar. 25, 2022

(65) Prior Publication Data

US 2022/0222071 A1 Jul. 14, 2022

(51) Int. Cl.
*G06F 9/44* (2018.01)
*G06F 8/10* (2018.01)
*G06F 8/73* (2018.01)
*G06F 8/77* (2018.01)

(52) U.S. Cl.
CPC .................. *G06F 8/77* (2013.01); *G06F 8/10* (2013.01); *G06F 8/73* (2013.01)

(58) Field of Classification Search
CPC .................. G06F 8/77; G06F 8/10; G06F 8/73
See application file for complete search history.

(56) References Cited

U.S. PATENT DOCUMENTS

| | | | |
|---|---|---|---|
| 11,661,072 B1* | 5/2023 | Cardona | G06N 3/04 701/29.3 |
| 2022/0048533 A1* | 2/2022 | Ödblom | G06F 11/3698 |
| 2023/0001936 A1* | 1/2023 | Skaggs | G06N 3/084 |
| 2023/0177892 A1* | 6/2023 | Thoele | G06Q 30/0278 701/1 |

* cited by examiner

*Primary Examiner* — Qamrun Nahar
(74) *Attorney, Agent, or Firm* — Viering, Jentschura & Partner mbB

(57) ABSTRACT

Disclosed herein is a device, system, and/or method for evaluating functional safety compliance for a software program against a plurality of requirements. The device includes a processor that determines a plurality of implementation values for developing the software program. Each implementation value of the plurality of implementation values is associated with a corresponding requirement of the plurality of requirements, and each implementation value is determined based on a level of compliance of the software program to the corresponding requirement. The device also determines a risk priority number for the software program based on an aggregation of the plurality of implementation values. The risk priority number may also be based on a severity value and/or a detectability value. The device also determines a safety score for the software program based on whether the risk priority number satisfies a predefined threshold.

24 Claims, 5 Drawing Sheets

EVALUATION OF SOFTWARE PROGRAMS FOR COMPLIANCE WITH FUNCTIONAL SAFETY

TECHNICAL FIELD

The disclosure relates generally to vehicle safety systems, and in particular, to systems, devices, and methods for evaluating the functional safety of software.

BACKGROUND

As safety features of vehicles become more and more automated, evaluating the functional safety of software used in a vehicle's safety implementation may be helpful to understanding the overall safety of the vehicle. While automotive safety standards have been developed that specify certain recommended functional requirements and associated implementation guidelines, the functional safety of a vehicle's actual software implementation may differ from the recommended requirements set forth in the standard. Thus, when assessing the functional safety of a given software implementation, subjective interpretations associated with a given failure mode may be employed in order to evaluate the functional safety of the software. However, by including a subjective component into the functional safety evaluation of the software used in a vehicle, there may be significant differences depending on the subjective criteria applied during the evaluation. Inconsistent evaluations for the functional safety of the software implementation may result, which depend on the particular subjective analysis used in the evaluation.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various exemplary aspects of the disclosure are described with reference to the following drawings, in which.

DESCRIPTION

Figure 1:
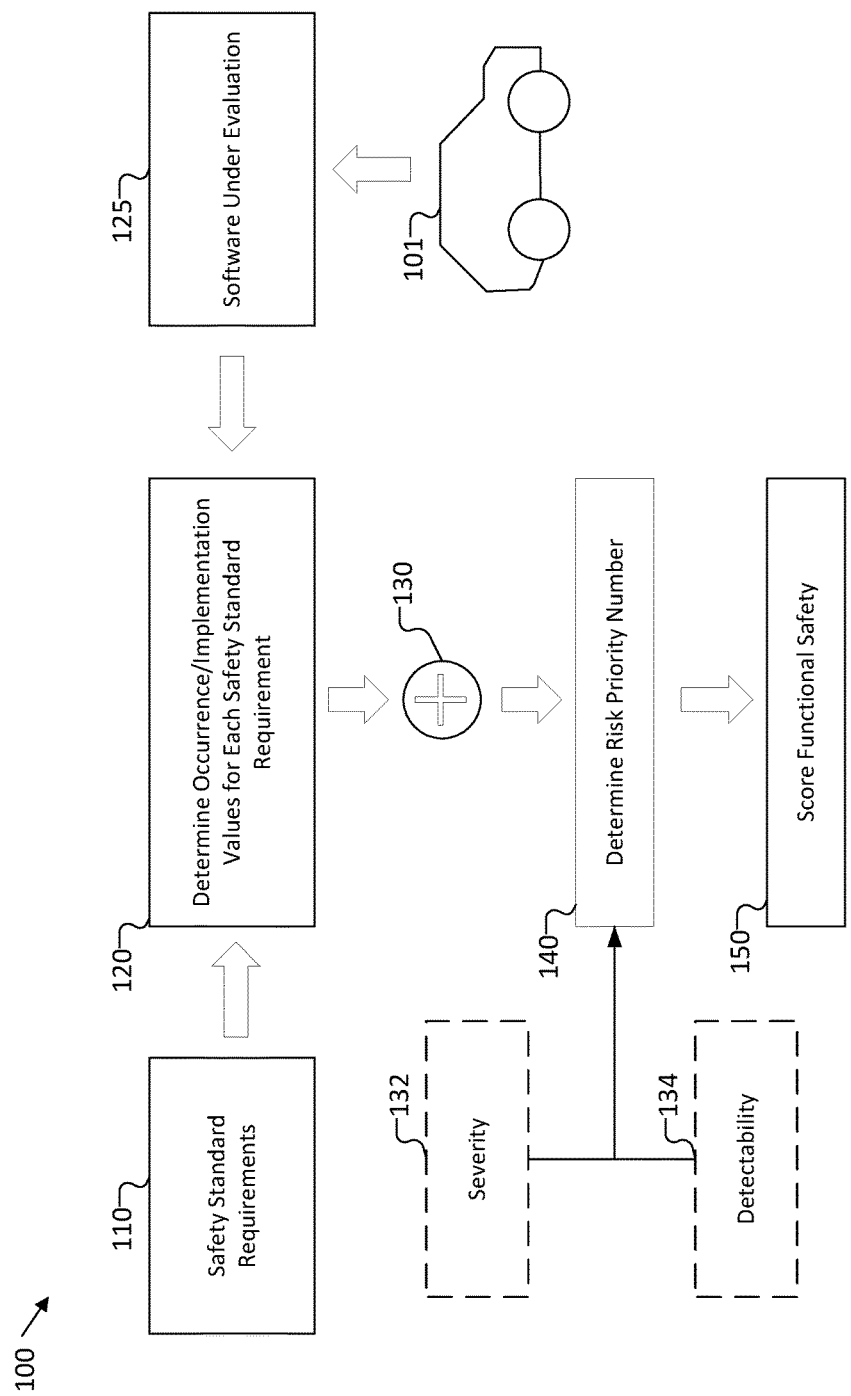
FIG. 1 shows an exemplary system for evaluating the functional safety of software that may be used in a vehicle.

The following detailed description refers to the accompanying drawings that show, by way of illustration, exemplary details and features.

The word "exemplary" is used herein to mean "serving as an example, instance, or illustration." Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [. . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [. . . ], etc.).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in the form of a pointer. The term "data", however, is not limited to the aforementioned examples and may take various forms and represent any information as understood in the art.

The terms "processor" or "controller" as, for example, used herein may be understood as any kind of technological entity (e.g., hardware, software, and/or a combination of both) that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, software, firmware, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

A "vehicle" may be understood to include any type of machinery that may be operated by software, including autonomous, partially autonomous, stationary, moving, or other objects or entities that utilize software as part of their operation. By way of example, a vehicle may be a driven object with a combustion engine, a reaction engine, an electrically driven object, a hybrid driven object, or a combination thereof. A vehicle may be or may include an automobile, a bus, a mini bus, a van, a truck, a mobile home, a vehicle trailer, a motorcycle, a bicycle, a tricycle, a train locomotive, a train wagon, a robot, a personal transporter, a boat, a ship, a submersible, a submarine, a drone, an aircraft, industrial machinery, autonomous or partially autonomous machinery, or a rocket, among others.

As used herein "software" or "software program" may be understood as any type of system for processing information in an organized manner (e.g. source code, source code segments, programming code, a hierarchical application, etc.). The code segments may be executed on a processor and/or by means of a circuit which includes a processor or multiple processors, and any, all, or portions thereof may execute one or more portions of the code segments. As should be understood, software may be developed according to a software development plan, often in a multi-phased manner that may include phases for planning, defining requirements, designing, building, documenting, testing, deploying, and/or maintaining, etc. Each phase of the software development may have its own set of tasks and associated requirements. Any, all, or portions of the software development may be evaluated for its functional safety compliance. Thus, reference to developing software or developing a software program may refer to any phase(s), any task(s), and any combination thereof throughout the software development process.

As vehicles have become more automated and more autonomous, vehicle safety systems have become more complex such that it is both important and difficult to evaluate vehicle safety systems from a functional safety perspective. International standards have been developed that are associated with the functional safety for systems and software that may have been developed for and/or may be implemented in a vehicle's control systems. For example, the International Organization for Standardization (ISO) first published ISO 26262 in 2011. ISO 26262 is entitled "Road Vehicles—Functional Safety," and it contains requirements for the functional safety of electric and/or electronic systems, achieved through safety measures including safety mechanisms. Among other aspects, ISO 26262 provides an automotive-specific risk-based approach to determine integrity levels (also known as Automotive Safety Integrity Levels (ASILs), uses ASILs to specify which of the requirements of ISO 26262 are applicable to avoid unreasonable residual risk, and provides requirements for functional safety management, design, implementation, verification, validation and confirmation measures.

Another example is a standard developed by the International Electrotechnical Commission (IEC) that describes methods to apply, design, deploy, and maintain safety-related electronic systems. Entitled "Functional Safety of Electrical/Electronic/Programmable Electronic Safety-related Systems," IEC 61508 is a general functional safety standard that may be applied to multiple types of industries, including the automotive industry.

Even though such standards exist, the standards do not provide requirements for what qualitative measures should be used for assessing software against each target functional safety claim.

Conventional approaches to assessing the functional safety of software tend to use a qualitative Failure Mode and Effect Analysis (SW-FMEA), which usually involves a safety expert adopting an individualized safety analysis to check the list of failure modes associated with each software element that has been identified as within the scope of the functional safety claim, to determine qualitative measurements for each failure mode, and to propose countermeasures that may prevent and/or mitigate negative effects that might violate the overall safety goal (also called a Safety Integrity Level or "SIL" in IEC 61508 or an Automotive Safety Integrity Level "ASIL" in ISO 26262, collectively referred to herein as "(A)SIL"). The (A)SIL levels represent a standardized way for specifying minimum functional safety standard requirements and safety measures for control systems. The standardized requirements for each (A)SIL level are designed to provide a certain level of assurance (according to the particular (A)SIL target) that a system has been designed to avoid unreasonable safety risks if a failure were to occur. During the definition phase for the particular system, for example, the target value for the (A)SIL may be set for each software element that forms a part of the overall software under evaluation and contributes to the overall safety goal. In the definition phase, a hazard and risk analysis may be performed by the final integrator to determine the safety goals for the system for each hazardous event and a corresponding (A)SIL. Each aspect of the system (e.g., hardware and/or software) inherits (A)SIL targets that are associated with safety-related functionalities for satisfying the safety goal, which may include hardware requirements and software requirements. Once the (A)SIL-based requirements have been defined, those who are accountable for developing the hardware and/or software (e.g., designers, safety expert, assessors, regulators, etc.), jointly plan functional safety activities designed to provide sufficient arguments, assurance, and data that shows compliance to the necessary requirements for the target (A)SIL, as outlined in the standard. With respect to software, software requirements are defined that may include development process related requirements. In order to comply with the target (A)SIL level, the software must fulfill the development process related requirements as outlined for the target (A)SIL level.

In this context, a SW-FMEA approach may be used to evaluate the robustness of the software against the (A)SIL target by identifying potential failure modes and the potential cause(s) attributable to the software product under evaluation. The approach may analyze the possible effects in the usage context and evaluate the probabilities associated with the occurrence (O), severity (S), and controllability/detectability (D) of each failure mode. The occurrence, for example, may characterize the estimated frequency of the failure mode as "occasional," "often", etc. The severity may estimate the type and extent of harm that may result from the failure mode (e.g., hitting a pedestrian, damaging property, etc.). The controllability/detectability may estimate the capability of the system to detect, prevent, and/or mitigate the effect of failure modes. Each of these three parameters, occurrence (O), severity (S) and controllability/detectability (C or D) may be normalized (e.g., to a value between 1 and 10, where 1 represents the best case and 10 the worst case) so that they may be combined to arrive a risk priority number (RPN) for each failure mode. The RPN for each failure mode may then be evaluated to determine whether the software under evaluation satisfies the (A)SIL target.

As should be appreciated, the evaluation of software against an (A)SIL target may be different based on the methodology used by the expert to evaluate occurrence, severity, controllability/detectability for an (A)SIL target. This is because the conventional approach is often based on the subjective perception of the safety expert who is responsible for evaluating the parameters (e.g., severity, occurrence, detectability, etc.) that may be associated with a given failure mode for the software under examination. For example, one failure mode for a software implementation may be "Memory corruption in Linux kernel." For this failure mode, the safety expert would subjectively associate the failure mode with an estimate of the frequency of the failure mode occurring (e.g., its occurrence value), and then group the values into differing levels based on the frequency of the failure (e.g., very frequently, moderately to occasionally, rarely, very rarely, infrequently, very infrequently, etc.). This subjective aspect to evaluation may have an impact on (1) the design and implementation of software products that are targeted to a particular (A)SIL and (2) the certification/qualification of a software product by reverse engineering. With conventional approaches (e.g., ones that use subjective techniques and methods) to the functional safety standards, a mapping is typically used that may then be applied to a given functional safety project, including, for example, using a "trusted" mapping for quality criteria and measures addressing specific functional safety aspects or properties.

However, because conventional approaches use subjective techniques (e.g., to estimate occurrence values), the SW-FMEA is based on the expert's subjective interpretation of each individual requirement within the context of the software product under evaluation. As a result, the safety assessment of a software implementation (e.g., its risk priority number or RPN) against functional safety standards may not be homogenous or repeatable for the associated risks. In other words, there may be no standard way to assess the safety of a given software implementation, even if safety standards (e.g., ISO 26262, IEC 61508, etc.) are used as a guide. Because of the inherent subjectivity, even a standards-based evaluation may produce different results from different experts, and unraveling these differing results may be time consuming and may be difficult to harmonize into a commonly accepted standard. In addition, these different results from differing interpretations may lead to additional costs, because it may increase the time needed to resolve compliance questions in discussions with safety assessors.

Another problem with the conventional approach to SW-FMEA is that it may not consider the effects of how using redundant software elements to implement a given functionality may impact its compliance with a target (A)SIL. For example, some functional safety standards allow for complying with a target (A)SIL using multiple (e.g., redundant) software elements that each may not individually satisfy an (A)SIL target for a given functionality, but that when taken together, if there is a sufficient level of independence among the individual software elements, they may collectively provide the functionality and satisfy the (A)SIL target level. In ISO 26262, for example, this is called ASIL decomposition and in IEC 61508, this is called an SIL combination. However, the conventional approach to a safety analysis may not account for potential improvement—due to the redundancy of the multiple software elements—in the overall compliance of the system to an (A)SIL target level.

The system for evaluating the functional safety of software products discussed in more detail below may provide advantages over the conventional SW-FMEA approach. For example, the disclosed system may be based on objective, measurable, and reproducible criteria that do not depend on subjective inputs. In addition, the disclosed system may determine whether a calculated risk priority number (RPN) satisfies certain thresholds for the target ASIL/SIL level (e.g., ASIL D, ASIL C, ASIL, B, ASIL A, Quality Management ("QM"); SC3, SC2, SC1, QM; no QM, etc.). For software that satisfies a requirement based on a decomposed (or combined) schema, the system may calculate the RPN for each of the individual software elements, which allows for determining the compliance of a decomposed (or combined) schema with respect to the overall ASIL/SIL target for the software under evaluation.

As opposed to the subjective definitions for occurrence, severity, and controllability/detectability discussed above, the disclosed system may use improved definitions that provide an objective standard for evaluating the functional safety of a software program. For example, the occurrence (O) may be defined as the probability that the systematic failure occurs due to the software development process. The severity (S) may be defined as the probability that a systematic failure would corrupt the architectural design, which in turn would compromise the safety function provided by the software. The controllability/detectability (D) may be defined as a confidence level for measures external to the software for detecting the presence of failure. Based on these definitions, the evaluation system may calculate a risk priority number for each failure mode ($RPN_{fm}$) based on the occurrence for failure mode ($O_{fm}$) the severity ($S_{fm}$) for the failure mode, and the detectability ($D_{fm}$), using, for example, the following formula:

$$RPN_{fm} = O_{fm} \times S_{fm} \times D_{fm}$$

Then, the evaluation system may compute the RPN for the overall software under evaluation ($RPN_{Design}$) as:

$$RPN_{Design} = \max(RPN_{fm})$$

In this sense, the $RPN_{Design}$ may be understood as the worst of the $RPN_{fm}$ values determined from among all the failure modes belonging to the same design (e.g., the failure mode associated with the highest risk priority number). Once $RPN_{Design}$ has been calculated, a safety score may be determined by comparing $RPN_{Design}$ against a common threshold value ($RPN_{threshold}$) associated with a target RPN for the design to see whether and to what extent the software falls short, meets, or exceeds the overall (A)SIL target for the software under evaluation.

When occurrence is defined as the probability that the systematic failure occurs due to the development process, it should be appreciated that the occurrence will not depend on the specific failure mode being evaluated, so each occurrence value for each failure mode may be the same such that $O_{fm_1}=O_{fm_2}=O_{fm_n}=O$, and the $RPN_{Design}$ may be simplified to:

$$RPN_{Design}=O\times\max(S_{fm}\times D_{fm})$$

As will be discussed in more detail below, such a definition of occurrence may make it possible to account for the improved detectability associated with ASIL decomposition and/or SIL combination schemas.

One feature of the occurrence definition used in the disclosed system, in contrast to the conventional definition, is that occurrence is not based on periodicity (e.g., the frequency of an event or the duration of a software execution) that would otherwise require a subjective evaluation as to how the particular failure mode in a particular use case would expose risks to the end-user. Typically, conventional approaches attempt to address issues like periodicity, demand, synchronism, etc. as part of the software development process in the form of resource management, requirements definitions, synchronization, interrupts management, etc. that are mapped to a ranked scale (e.g., from 1 to 10) that represents a subjective assessment of the failure rate for the specific scenario, where low numbers may imply a low failure rate and high numbers may imply a high failure rate. For example, 1 and 2 may correspond to a "remote" occurrence, 3 and 4 may correspond to a "low" or "occasional" occurrence; 6 and 7 to "moderate" or "significant" occurrence; 8 to "high" or "frequent" occurrence; and 9 and 10 may correspond to a "very high" occurrence. Irrespective of how well an expert may estimate a failure rate frequency, there is still no direct connection between this type of subjective determination and the safety standard's expectation. The subjectivity implied by such an approach means that there is no way to verify weather the software actually satisfies the (A)SIL target, except through unverified reliance on the expert's subjectivity.

The disclosed system removes this subjectivity and directly ties the occurrence levels to the compliance of the software program under evaluation to a particular (A)SIL level. For example, the occurrence level definition may map a compliance level to an occurrence value as shown below in Table 1 for ASIL compliance and SIL compliance:

TABLE 1

| Occurrence Definition | | Occurrence (O) |
|---|---|---|
| ASIL Compliance | SIL Compliance | Level |
| ASIL D | — | 1 |
| ASIL C | SC3 | 2 |
| ASIL B | SC2 | 3 |
| ASIL A | SC1 | 4 |
| QM | QM | 5 |
| no QM | no QM | 10 |

Note that in the above example, the table does not map an SIL compliance level to an occurrence value of "1" because a compliance level of "SC4" is not permitted for microprocessors under the IEC 61058 standard. In any event, as should be appreciated, the particular occurrence value (e.g., 1, 3, 4, 5, and 10) to which the (A)SIL standard compliance levels have been mapped may be selected to have different values than those shown in Table 1, and the above-listed numbers are merely exemplary. Importantly, however, once mapped, the occurrence value (O) may represent a particular compliance level to the standard (e.g., ASIL D, ASIL A, SC3, SC1, QM, etc.).

Next, the evaluation system may assign each requirement in the standard to an implementation value (e.g., a weighting) that may depend on the extent to which the standard recommends implementing the individual requirement (e.g., the degree of recommendation) to achieve compliance with the corresponding (A)SIL level. In this sense, the implementation value for each individual requirement may contribute to the overall occurrence level. For example, if a particular requirement is "highly recommended" for ASIL D compliance but only "recommended" for ASIL A compliance, the occurrence contribution of this particular requirement to an ASIL A target may be lower than its contribution to an ASIL D target. Similarly, if the standard does not recommend a particular requirement or it is optional for achieving compliance with an (A)SIL target level, the occurrence contribution of the requirement may be very low (e.g., zero). Each requirement in the IEC 61508 standard is identified as "HR," "R," "- - -," or "NR" which respectively correspond to "Highly Recommended," "Recommended," not applicable, and "Not Recommended" for the particular SIL target level, each of which may be mapped to an occurrence contribution for the SIL target level. Each requirement in the ISO 26262 standard is identified as "++," "+," or "o" which respectively correspond to highly recommended, recommended, and optional).

As shown, for example, in Table 2 below, each requirement has been associated with an occurrence contribution that depends on the extent of its recommendation to achieving a particular ASIL target level.

TABLE 2

| | | Implementation Recommendation ASIL | | | | Occurrence Contribution ASIL | | | |
|---|---|---|---|---|---|---|---|---|---|
| Phase | Method | A | B | C | D | A | B | C | D |
| Model | Model each planned function | + | ++ | ++ | ++ | 1 | 2 | 2 | 2 |
| Architect | Use of informal notations | ++ | ++ | + | + | 2 | 2 | 1 | 1 |
| Coding | Avoid global variable usage | + | + | ++ | ++ | 1 | 1 | 2 | 2 |
| Testing | Fault injection testing | + | + | + | ++ | 1 | 1 | 1 | 2 |

As should be appreciated, Table 2 is merely exemplary, and the particular requirements, implementation recommendation, and corresponding occurrence contribution may cover any requirements and any standard to which a software implementation may be evaluated, including requirements of the ISO 26262 standard and/or the IEC 61508 standard, as examples.

In addition, each occurrence contribution of the particular requirement may be weighted by other factors, including, for example, to what phase of the software development process the requirement is addressed (e.g., in the architectural design phase, coding phase, testing phase, etc.), as shown, for example in Table 3 below.

TABLE 3

| Software Development | | Implementation Recommendation ASIL | | | | Occurrence Contribution ASIL | | | | Criticality |
| --- | --- | --- | --- | --- | --- | --- | --- | --- | --- | --- |
| Phase | Requirement | A | B | C | D | A | B | C | D | (weight) |
| Model | Model each planned function | + | ++ | ++ | ++ | 1 | 2 | 2 | 2 | 1 |
| Architect | Use of informal notations | ++ | ++ | + | + | 2 | 2 | 1 | 1 | 1 |
| Coding | Avoid global variable usage | + | + | ++ | ++ | 1 | 1 | 2 | 2 | 2 |
| Testing | Fault injection testing | + | + | + | ++ | 1 | 1 | 1 | 2 | 2 |

Thus, the occurrence contribution may be multiplied by the criticality weight to arrive at a weighted occurrence contribution. Using Table 3 as an example, the requirement of "Avoid global variable usage" from the coding phase may be more critical than the requirement of "Model each planned function" from the modeling phase. As such, the "Avoid global variable usage" requirement may be associated with a higher weighting, such that the weighted occurrence contribution results in a higher value. If "Avoid global variable usage" is implemented in an software program with an ASIL D target, this requirement may have a weighted occurrence contribution of $O_{contribution_{weighted}}=2\times2=4$. On the other hand, if "Model each planned function" is implemented in a software program with an ASIL D target, this requirement may have a weighted occurrence contribution of $O_{contribution_{weighted}}=2\times1=2$ due to its association with the modeling phase as opposed to the coding phase.

Next, the occurrence contribution for the overall software under evaluation may be determined by aggregating the individual occurrence contributions (or weighted occurrence contributions) for each requirement, depending on whether the software under evaluation has followed the corresponding requirement for the (A)SIL target level. For example, each individual occurrence contribution that has been implemented by the software under evaluation may be summed together by the evaluation system to determine the aggregated occurrence contribution ($O_{contribution}$) for the software under evaluation. The aggregated occurrence contribution may then be used to determine whether the software under evaluation conforms to a particular (A)SIL target level by comparing the aggregated occurrence contribution to predetermined threshold(s) that may be associated with different target (A)SIL levels and mapped to a normalized occurrence value, as shown below, for example, in Table 4 for ISO 26262 and in Table 5 for IEC 61508.

TABLE 4

| Occurrence Contribution Thresholds | ASIL (ISO 26262) | Occurrence (O) Level |
| --- | --- | --- |
| $248 \leq O_{contribution}$ | D | 1 |
| $226 \leq O_{contribution} < 248$ | C | 2 |
| $164 \leq O_{contribution} < 226$ | B | 3 |
| $112 \leq O_{contribution} < 164$ | A | 4 |
| $56 \leq O_{contribution} < 112$ | QM | 5 |
| $0 \leq O_{contribution} < 56$ | No QM | 10 |

TABLE 5

| Occurrence Contribution Thresholds | SIL (IEC 61508) | Occurrence (O) Level |
| --- | --- | --- |
| $288 \leq O_{contribution}$ | SC3 | 2 |
| $138 \leq O_{contribution} < 288$ | SC2 | 3 |
| $74 \leq O_{contribution} < 138$ | SC1 | 4 |
| $36 \leq O_{contribution} < 74$ | QM | 5 |
| $0 \leq O_{contribution} < 36$ | No QM | 10 |

As should be appreciated, Tables 4 and 5 are merely exemplary, and the thresholds for the aggregated occurrence contribution for each (A)SIL target may be set to any level and may depend on the values chosen for the occurrence contribution for each individual requirement and its associated weighting(s). As noted earlier, the evaluation system may map each (A)SIL target to an overall occurrence value that directly ties the overall occurrence contribution to an (A)SIL target level and to an occurrence level indicating the compliance of the software under evaluation to a particular (A)SIL level.

As discussed earlier, this disclosed approach to evaluating the functional safety of software programs may provide certain benefits over the conventional approach. By determining the occurrence value based on the extent to which the software program under evaluation implements the individual requirements, the occurrence value becomes directly tied to the standard's requirements for achieving a particular (A)SIL target level. Unlike the conventional approach, the disclosed approach embeds the normative requirements from the standard into the definition of occurrence itself. In addition, this definition of occurrence may remove the subjectivity associated with a conventional view of occurrence that is based on periodicity (e.g., demand, synchronism, frequency, etc.) and instead uses an objective view of the software development process. Moreover, the disclosed definition of occurrence may be easily automated and used to evaluate the functional safety level of existing software products (e.g., "off the shelf" products) that may not have been designed to a particular standard and/or that have no claims to a particular functional safety level for a given safety requirement.

FIG. 1 shows an exemplary evaluation system 100 for evaluating the functional safety of a software program that may be used, for example, in a vehicle. For example, vehicle 101 may use a software program 125 (e.g., as part of a vehicle safety system, for example) that has been designed to certain functional safety standard requirements (e.g., designed to certain requirements of ISO 26262 and/or IEC 61508, as examples). To evaluate the functional safety of the software program 125 to the functional safety standard, the evaluation system 100 may, in 120, receive a set of safety standard requirements 110 that are part of the standard against which the evaluation system 100 may evaluate the software program 125. The evaluation system 100 may use, in 120, the safety standard requirements 110 to determine an implementation value (e.g., an "occurrence" value that uses the non-subjective definition discussed above) for each safety requirement, where the implementation values indicate the extent to which the software program implements each of the safety standard requirements 110. As discussed above, the evaluation system 100 may weight each implementation value for each requirement based on any number of factors, including, for example, the criticality of the requirement, e.g., based on the phase of the development process to which the requirement pertains.

As should be understood, "implementing" a requirement may relate to any part of the software development process and whether the process complied with a particular requirement during a particular phase of development. So, if a development requirement (e.g. as defined in the standard) is to "maintain specification documents," the evaluation system may consider the requirement implemented in the software if specification documents were maintained while developing the software. Similarly, if a development requirement is to "complete fault injection testing," the evaluation system may consider the requirement implemented in the software if fault injection testing was completed during the development of the software. Thus, depending on the type of requirement and in what software development phase it may occur, the "implementation" may not necessarily involve an actual portion of source code but rather may relate to any aspect of the development process for the software under evaluation. The information about the development aspects for the software (e.g., documentation/details indicating whether and how the requirement was implemented for each requirement) may be stored (e.g., in a memory) as part of the software, together with the software, or separate from the software. This information may be stored in any number of formats, including, for example, a requirements/specification document, a requirements database, a software development management program, a traceability matrix, a coding documentation platform, etc., and may be provided to the evaluation system 100 for determining the extent to which the software program implements each requirement (e.g., for determining the implementation value (occurrence)). As shown in the example of FIG. 1, the information about the development details (from which evaluation system 100 may determine appropriate implementation values) may have been stored in the vehicle 101 along with the software program under evaluation and evaluation system 100 may receive it, in 120, from vehicle 101. As should be appreciated, this information may be received from any type of input, and it need not be received from vehicle 101.

In aggregator 130, the evaluation system 100 may aggregate the determined implementation values (and/or the weighted implementation values) for each requirement of the standard against which evaluation system 100 evaluates the software program 125. As discussed above, the evaluation system 100 may determine the aggregated implementation value (e.g., the occurrence contribution for the overall software implementation) by summing the individual implementation values (or weighted implementation values) for each requirement, based on whether the software program 125 has followed the corresponding requirement for the (A)SIL target level. For example, each individual implementation value for a requirement that has been implemented by the software program 125 under evaluation may be summed together to determine the aggregated occurrence contribution (e.g., $O_{contribution}$) for the software program 125.

Next, the evaluation system 100 may, in 140, determine a risk priority number based on the aggregated implementation value. As also noted above and discussed in more detail below, the risk priority number may also be determined based on a severity value 132 and/or a detectability value 134. Once the evaluation system 100 has determined the risk priority number, the evaluation system 100 may, in 150, score the functional safety based on whether the determined risk priority number meets or exceeds a predetermined threshold level for the overall (A)SIL target level. The risk priority number may be the aggregated implementation value and the score may be based on predetermined thresholds that correspond to an overall (A)SIL target level, as shown below, for example, in Table 6 using ISO 26262 as an example and in Table 7 using IEC 61508 as an example:

TABLE 6

| Aggregated Implementation Value Thresholds | ASIL (ISO 26262) |
|---|---|
| $248 \leq O_{contribution}$ | D |
| $226 \leq O_{contribution} < 248$ | C |
| $164 \leq O_{contribution} < 226$ | B |
| $112 \leq O_{contribution} < 164$ | A |
| $56 \leq O_{contribution} < 112$ | QM |
| $0 \leq O_{contribution} < 56$ | No QM |

TABLE 7

| Aggregated Implementation Value Thresholds | SIL (IEC 61508) |
|---|---|
| $288 \leq O_{contribution}$ | SC3 |
| $138 \leq O_{contribution} < 288$ | SC2 |
| $74 \leq O_{contribution} < 138$ | SC1 |
| $36 \leq O_{contribution} < 74$ | QM |
| $0 \leq O_{contribution} < 36$ | No QM |

In addition, the evaluation system 100 may determine a risk priority number based on the aggregated implementation value as well as other factors, such as, for example, a severity value 132 and/or a controllability/detectability value 134, as will be discussed in more detail below. For this purpose, the aggregated implementation value for the overall software program 125 under evaluation (e.g., $O_{contribution}$ in 130) may be normalized to a predetermined occurrence level value based on the range of thresholds, as shown in Tables 8 and 9 below, so that the compliance of the design (e.g., the overall software program 125 under evaluation) to the target (A)SIL may be within a fixed range of levels (e.g., between 1 and 10).

TABLE 8

| Occurrence Contribution Thresholds | ASIL (ISO 26262) | Occurrence (O) Level |
|---|---|---|
| $248 \leq O_{contribution}$ | D | 1 |
| $226 \leq O_{contribution} < 248$ | C | 2 |
| $164 \leq O_{contribution} < 226$ | B | 3 |
| $112 \leq O_{contribution} < 164$ | A | 4 |
| $56 \leq O_{contribution} < 112$ | QM | 5 |
| $0 \leq O_{contribution} < 56$ | No QM | 10 |

TABLE 9

| Occurrence Contribution Thresholds | SIL (IEC 61508) | Occurrence (O) Level |
|---|---|---|
| $288 \leq O_{contribution}$ | SC3 | 2 |
| $138 \leq O_{contribution} < 288$ | SC2 | 3 |
| $74 \leq O_{contribution} < 138$ | SC1 | 4 |
| $36 \leq O_{contribution} < 74$ | QM | 5 |
| $0 \leq O_{contribution} < 36$ | No QM | 10 |

Using the example values in Table 8, if the aggregated implementation value for the overall software program 125 under evaluation is greater than or equal to 164 but less than 226, the design may be assigned an occurrence level of 3. If the aggregated implementation value for the overall software program 125 under evaluation is greater than or equal to 226 but less than 248, the evaluation may assign the design an occurrence level of 4. This normalized occurrence level may then be used along with other the factors, such as a severity value 132 and/or controllability/detectability value 134 (also normalized to the same fixed range of levels (e.g., between 1 and 10)), to determine the risk priority number and to score the overall software under evaluation against the predetermined threshold.

As should be appreciated, these particular values are merely exemplary, and the normalization and thresholds for the aggregated occurrence contribution for each (A)SIL target may be set to any level and may depend on the values chosen for the occurrence contribution for each individual requirement and its associated weighting(s). As noted earlier, the evaluation system may map each (A)SIL target to an overall occurrence value for the design that directly ties the overall occurrence contribution to an (A)SIL target level and to an occurrence levels indicating the compliance of the software program 125 under evaluation to a particular (A)SIL level.

In addition to occurrence values, the risk priority number may also depend on a severity (S) value 132. Conventionally, severity values depend on the particular use case and the extent of impact a particular failure may have with respect to the software product under evaluation. However, in evaluation system 100, where subjectivity may be removed from the evaluation through the definition of occurrence discussed above, severity (S) 132 may be defined as the probability that a systematic failure would corrupt the architectural design (e.g., the function provided by the software program 125 under evaluation), where a low severity level may indicate a failure has no compromising effect on the safety function provided by the software program 125 and a high severity level indicates a failure has a compromising effect on the safety function provided by the software program 125. When normalized to a fixed range of levels (e.g., between 1 and 10), the evaluation system may define the severity level 132 as shown below in Table 10:

TABLE 10

| Severity (S) Level | Definition |
|---|---|
| 1 | Failure will not compromise a safety function provided by the software |
| 10 | Failure will compromise a safety function provided by the software |

This simplified definition of severity removes the need to use a detailed qualitative evaluation of the effect of the failure. Such a definition provides a conservative approach to severity, where any compromising effect to the safety functionality provided by the software program may simply be considered a fatal effect, so there may be no need for intermediate values (e.g., 2 through 9) that lie between the lowest severity of "no effect" (e.g., 1) and the highest severity of "fatal" (e.g., 10). Of course, this mapping and conservative approach is only exemplary, and different values, including intermediate values, may be used for severity values.

The risk priority number may also depend on a controllability/detectability (collectively, "detectability") value 134. Conventional detectability values typically depend on the particular use case and the extent of internal mechanisms or testing/self-correction that may be applicable for detecting or mitigating system failures in the software product 125 under evaluation. However, in evaluation system 100, where subjectivity may be removed from the evaluation through the approach to occurrence discussed above, detectability (D) 134 may be defined as whether the failure mode is detectable by at least one diagnostic measure, where a low detectability level may indicate the particular requirement is detectable by at least one diagnostic measure and a high detectability level indicates the requirement is not detectable. When normalized to a fixed range of values (e.g., between 1 and 10), the evaluation system may define the detectability level as shown below in Table 11:

TABLE 11

| Detectability (D) Level | Definition |
|---|---|
| 1 | Failure mode is detectable by a diagnostic measure |
| 10 | No detection measures for failure mode |

This simplified definition of detectability removes the need to use a detailed qualitative evaluation of the extent to which the failure may be detected, corrected, or mitigated. Such a definition provides a conservative approach to detectability, where any way of detecting a failure (e.g., through any diagnostic measure) may be considered sufficient, so there may be no need for intermediate values (e.g., 2 through 9) that lie between the lowest value of "detectable" (e.g., 1) and the highest value of "not detectable" (e.g., 10). Of course, this mapping and conservative approach is only exemplary, and different values, including intermediate values, may be used for detectability values.

Based on these subjective-free definitions for occurrence, severity, and detectability described above with respect to FIG. 100, where the level for each factor is mapped to normalized values between 1 and 10, a threshold risk priority number may be defined with respect to a target (A)SIL level, as shown below, for example, in Table 12 for ISO 26262 and in Table 13 for IEC 61508, based on situations that have a "worst case" severity (S=10) and "worst case" detectability (D=10), and where the occurrence level represents a minimum compliance level for the software program under evaluation, where each of the minimum recommended requirements for the corresponding target (A)SIL level have been implemented/satisfied.

TABLE 12

| ASIL (ISO 26262) | Occurrence (O) Level | Severity (S) Level | Detectability (D) Level | $RPN_{threshold}$ |
|---|---|---|---|---|
| D | 1 | 10 | 10 | 100 |
| C | 2 | 10 | 10 | 200 |
| B | 3 | 10 | 10 | 300 |
| A | 4 | 10 | 10 | 400 |
| QM | 5 | 10 | 10 | 500 |

TABLE 13

| SIL (IEC 61508) | Occurrence (O) Level | Severity (S) Level | Detectability (D) Level | $RPN_{threshold}$ |
|---|---|---|---|---|
| SC3 | 2 | 10 | 10 | 200 |
| SC2 | 3 | 10 | 10 | 300 |
| SC1 | 4 | 10 | 10 | 400 |
| QM | 5 | 10 | 10 | 500 |

As should be appreciated, Tables 12 and 13 are merely exemplary, and the threshold level ($RPN_{threshold}$) associated with each target (A)SIL level may depend on the normative scale (e.g., 1 through 10) used for each of the factors, and whether the severity and detectability are evaluated and used to determine the RPN. If severity and detectability are not evaluated, the evaluation system may use "worst case" values (e.g., 10 in a normalized range of 1 to 10) to determine the RPN. Irrespective of the normative scale, the $RPN_{threshold}$ may be used to score the software program against the target (A)SIL level by comparing the $RPN_{design}$, calculated using the actual implementation values for each requirement, to the $RPN_{threshold}$. If the $RPN_{design} \leq RPN_{thresdhold}$ for the target (A)SIL level, then the software program may be scored as complying with the target (A)SIL level.

As noted above, the software program under evaluation may satisfy an (A)SIL target using multiple (e.g., redundant) software elements, each of which may not independently satisfy the (A)SIL target level for a given requirement, but that when taken together, if there is a sufficient level of independence among the software elements, they may collectively meet the requirement and satisfy a higher (A)SIL target level for the overall software under evaluation. The standards refer to this type of implementation as a "decomposition," as described in ISO 26262, or a "combination," as described in IEC 61508.

Using decomposition in ISO 26262 as an example, Table 14 below shows exemplary schemas where the overall software system may achieve an ASIL target level for a given functionality based on a combination of individual software elements, where each individual element may not necessarily satisfy the ASIL target level.

TABLE 14

| ASIL Target | Decomposition Schemas | | |
|---|---|---|---|
| ASIL D | ASIL C(D) + ASIL A(D) | ASIL B(D) + ASIL B(D) | ASIL D(D) + QM(D) |
| ASIL C | ASIL B(C) + ASIL A(C) | ASIL C(C) + QM(C) | — |
| ASIL B | ASIL A(B) + ASIL A(B) | ASIL B(B) + QM(B) | — |
| ASIL A | ASIL A(A) + QM(A) | — | — |

As shown in the example of Table 14, a target level of ASIL D for the overall software under evaluation may be satisfied by using a software element designed to a ASIL C together with a software element designed to ASIL A. Together, the software elements provide the desired functionality and satisfy the ASIL target level. As another example, a target level of ASIL D may be satisfied by using a software element designed to ASIL B together with another software element designed to ASIL B. The three columns to the right of "ASIL Target" show alternative decomposition schemas that may be used to achieve the ASIL Target.

Evaluation 100 may account for the potential benefit provided by redundant software elements of a decomposition (or combination) schema with an adjustment to the detectability value 134. The evaluation system 100 may adjust the detectability value 134 to be the better of the detectability values of each of the software elements evaluated to either (1) the detectability for the individual software element (e.g., whether an external system or the individual software element includes at least one means for detecting a failure) or (2) the detectability based on the (A)SIL target of the overall software under evaluation. In other words, the detectability level for the decomposed system (D') may be the minimum value between the detectability value for the software element individually and the detectability value for the overall software under evaluation (which may account for the detectability provided by a "redundant" software element). The evaluation system may use the following formula to determine the decomposed detectability, where $RPN_{threshold}$ represents the $RPN_{threshold}$ for the (A)SIL target level for the overall software under evaluation, and O and S are the occurrence and severity for the individual software element:

$$D' = \min\left[D, \left(\frac{RPN_{threshold}}{O \times S}\right)\right]$$

Using the formula above and the ASILs from ISO 26262, Table 15 shows that below when software elements are part of a decomposition, the detectability value may improve from D to D' such that the overall system under evaluation may meet the target ASIL level:

TABLE 15

| Overall Software | | Individual Elements | | | | | | |
|---|---|---|---|---|---|---|---|---|
| | | | | | | Before Decomposition | | After Decomposition |
| ASIL Target | RPN Target | ASIL | S | O | D | RPN | D' | RPN |
| D | 100 | D | 10 | 1 | 10 | 100 | 10 | 100 |
| | | QM | 10 | 5 | 10 | 500 | 2 | 100 |
| | | A | 10 | 4 | 10 | 400 | 2 | 100 |
| | | C | 10 | 2 | 10 | 200 | 5 | 100 |
| | | B | 10 | 3 | 10 | 300 | 3 | 100 |
| | | B | 10 | 3 | 10 | 300 | 3 | 100 |
| C | 200 | C | 10 | 2 | 10 | 200 | 10 | 200 |
| | | QM | 10 | 5 | 10 | 500 | 4 | 200 |
| | | B | 10 | 3 | 10 | 300 | 6 | 200 |
| | | A | 10 | 4 | 10 | 400 | 5 | 200 |
| B | 300 | B | 10 | 3 | 10 | 300 | 10 | 300 |
| | | QM | 10 | 5 | 10 | 500 | 6 | 300 |
| | | A | 10 | 4 | 10 | 400 | 7 | 300 |
| | | A | 10 | 4 | 10 | 400 | 7 | 300 |
| A | 400 | A | 10 | 4 | 10 | 400 | 10 | 400 |
| | | QM | 10 | 5 | 10 | 500 | 8 | 400 |

Table 15 uses the normative scale of 1 to 10 discussed above with respect to severity, occurrence, and detectability, where S represents the worst case severity for the individual software element, O represents the a minimum compliance level for the individual software element (e.g., the implementation level or occurrence value for the individual software element to its individual ASIL level), and D represents the worst case detectability for the individual software element. D' represents the adjusted detectability level that accounts for the decomposition by using the target RPN threshold for the overall software under evaluation. As Table 15 shows, detectability may improve due to the redundancy of software elements in a decomposition schema, and as a result, evaluation system 100 may account for the potential benefit provided by such redundant software elements when evaluating the ASIL level for the overall software under evaluation.

In IEC 26262, a similar schema exists that is referred to as a "combination," where individual software elements may be used in combination to achieve a target level of compliance for a given functionality. Table 16 below shows exemplary combination schemas where the overall software under evaluation may achieve an SIL target level for a given functionality based on a combination of individual software elements, each software element not individually satisfy the SIL target level:

TABLE 16

| SIL Target | Combination Schemas |
|---|---|
| SC 3 | SC 2 + SC 2 |
| SC 2 | SC 1 + SC 1 |

Similar to the ASIL decomposition discussed above, as shown in the example of Table 16, an SIL target level of SC 3 for the overall software under evaluation may be satisfied by using a software element designed to a SC 2 level together with another software element designed to a SC 2 level. In the same manner as discussed above with ASIL decomposition, the evaluation system may apply the same methodology to SIL combinations. Of course, some constraints may apply due to certain requirements in the IEC 61508 standard. For example, IEC 61508 may not allow the combination of elements that have individual SIL levels only at a QM level. As another example, IEC 61508 may not allow the combination of elements that have different individual SIL levels (e.g., an SC 1 level element may not be combined with an SC 2 level element).

In any event, in the same manner as described above with respect to decomposition, the evaluation system 100 may account for the potential benefit provided in an implementation that uses "redundant" software elements by adjusting the detectability value 134. Using the same formula discussed above, the detectability level for the software elements of a combination (D') may be the minimum value between (1) the detectability value for the software element individually and (2) the detectability value for the overall software under evaluation (which may account for the detectability provided by a "redundant" software element). As shown in Table 17 below, the overall system under evaluation may meet the target SIL level using the combination of individual elements, even though the individual elements may not necessarily meet the SIL target level:

TABLE 17

| Overall Software | | Individual Elements | | | | | | |
|---|---|---|---|---|---|---|---|---|
| | | | | | | Before Combination | | After Combination |
| SIL Target | RPN Target | ASIL | S | O | D | RPN | D' | RPN |
| SC 3 | 200 | SC 2 | 10 | 3 | 10 | 300 | 6 | 200 |
| | | SC 2 | 10 | 3 | 10 | 300 | 6 | 200 |
| SC 2 | 300 | SC 1 | 10 | 4 | 10 | 400 | 7 | 300 |
| | | SC 1 | 10 | 4 | 10 | 400 | 7 | 300 |

Table 17 uses the normative scale of 1 to 10 discussed above with respect to severity, occurrence, and detectability, where S represents the worst case severity for the individual software element, O represents the a minimum compliance level for the individual software element (e.g., the implementation level or occurrence value for the individual software element to its individual SIL level), and D represents the worst case detectability for the individual software element. D' represents the adjusted detectability level that accounts for the combination by using the target RPN threshold for the overall software under evaluation. As table 17 shows, detectability may improve due to the combination of software elements, and as a result, evaluation system 100 may account for the potential benefit provided by such redundant software when evaluating the SIL level for the overall software under evaluation.

Figure 2:
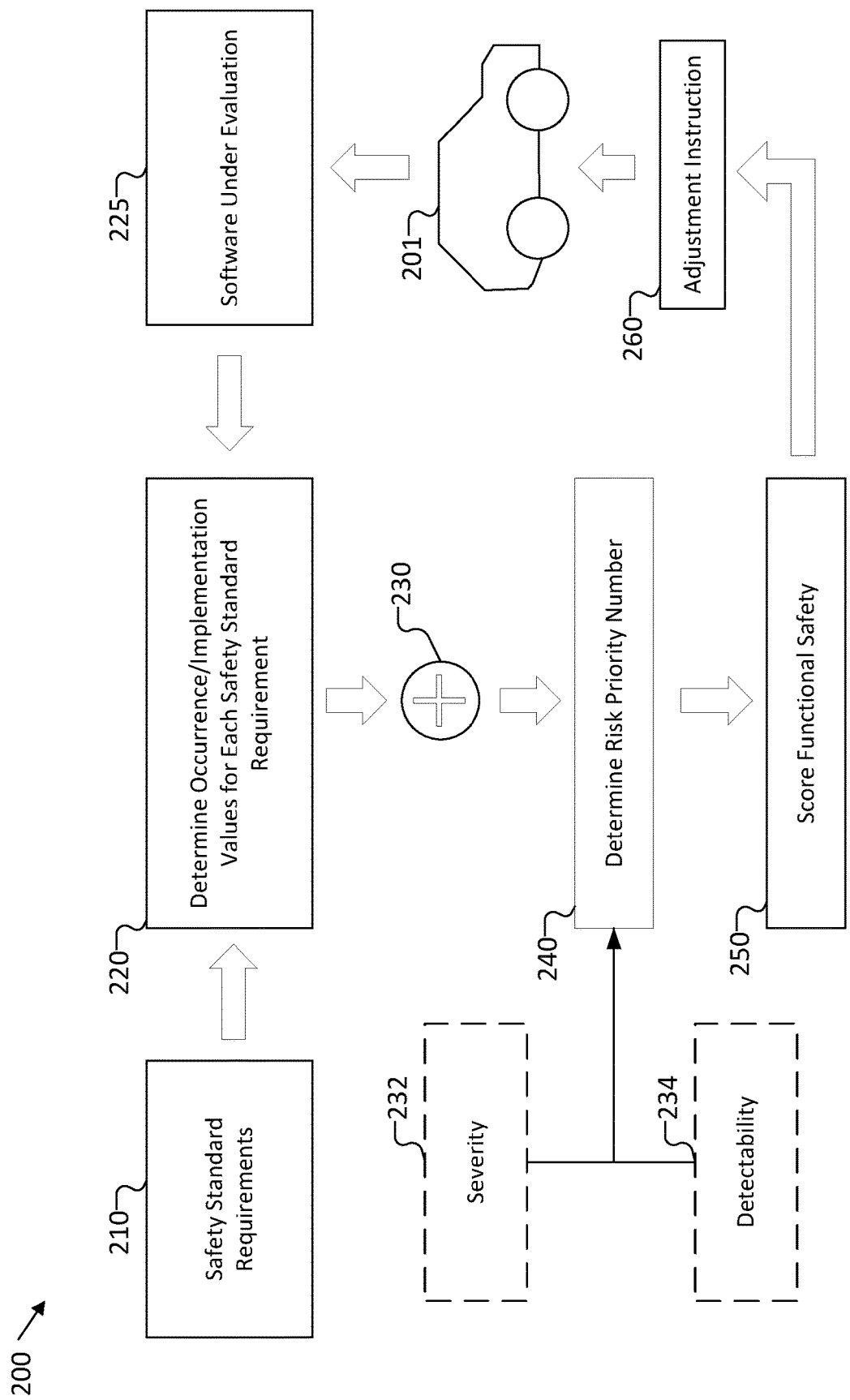
FIG. 2 shows an exemplary system for evaluating the functional safety of software that may be used in a vehicle.

FIG. 2 shows an exemplary evaluation system 200 for evaluating the functional safety of a software program 225 that may be used, for example, in a vehicle 201. Evaluation system 200 may include any of the features discussed above, including those discussed above with respect to the evaluation system 100 of FIG. 1. For brevity, reference is made to those discussions above, and they are not repeated here. Thus, features associated with safety standard requirements 110 may correspond to safety standard requirements 210, features associated with module 120 for determining implementation values may correspond to module 220 for determining implementation values, features associated with aggregator 130 may correspond to aggregator 230, features associated with module 140 for determining a risk priority number may correspond to module 240 for determining a risk priority number, features associated with module 150 for scoring functional safety may correspond to module 250 for scoring functional safety, features associated with severity value 132 may correspond with features associated with severity value 232, features associated with detectability value 134 may correspond with features associated with severity value 234.

In addition, evaluation system 200 may include module 260 for adjusting the operation of the vehicle 201 based on the safety score. As noted above with respect to FIG. 1, a vehicle (e.g., vehicle 101 or vehicle 201) may use a software program (e.g., software program 125 or software program 225 as part of a vehicle safety system, for example) that has been designed to certain functional safety standard requirements (e.g., safety standard requirements 110 and/or safety standard requirements 210 that may be or relate to normative requirements of ISO 26262 and/or IEC 61508, as examples). Evaluation system 200 may receive details about the vehicle's software program 225 in order to evaluate its compliance with functional safety requirements (e.g., determine a risk priority number and/or a functional safety score). Based on the determined score, module 260 may generate an instruction for adjusting the operation of the vehicle 201 based on the evaluation. For example, if the functional safety score of the evaluated software program 225 is below a predetermined threshold (e.g., a lower (A)SIL level than targeted), evaluation system 200 may provide instructions to vehicle 201 to adjust a driving profile (e.g., adjust a maximum allowed speed, adjust a maximum allowed acceleration, disable the vehicle's operability, etc.) of the vehicle 201 that is based on the functional safety score. If the safety score is too low (e.g., the overall (A)SIL level is below a predetermined threshold), for example, module 260 may generate an instruction to reduce the maximum allowed speed. If the safety score is satisfactory (e.g., the overall (A)SIL level is above a predetermined threshold), for example, module 260 may generate an instruction to increase the maximum allowed speed. If the vehicle 201 receives an updated software program, the evaluation system 200 may reevaluate the functional safety of the updated software program 225 and make a readjustment to the vehicle operation based on the updated safety score.

Figure 3:
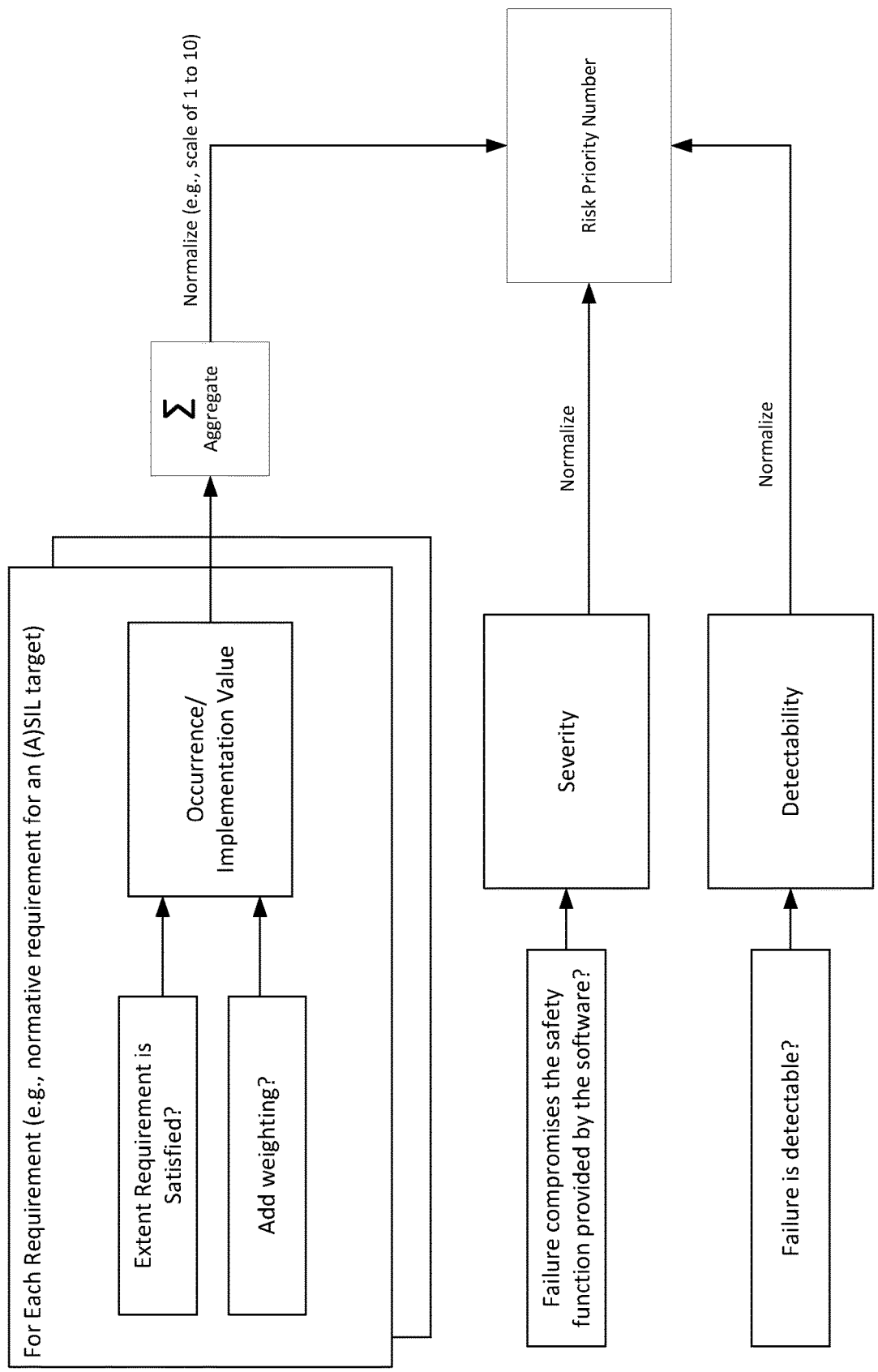
FIG. 3 illustrates an exemplary schematic drawing of how occurrence, severity, and detectability may be objectively defined to relate risk priority number.

FIG. 3 shows how the disclosed evaluation system (e.g., evaluation system 100 and/or evaluation system 200) may determine the risk priority number based on improved definitions of occurrence (e.g., implementation value), severity value, and/or detectability value. For example, for each requirement (e.g., a normative requirement for an (A)SIL target), the evaluation system may determine the occurrence (e.g., implementation value) based on whether the software under evaluation has satisfied/implemented the requirement. The implementation value may also be based on a weighting for the particular requirement, where the weighting may depend on, as examples, the phase of development to which the particular requirement applies, the importance of the requirement to other aspects of the development process, etc. The evaluation system may aggregate (e.g., sum) the implementation values (or weighted implementation values) and normalize the aggregation to an occurrence value that falls within a discrete value scale (e.g., a scale of 1 to 10). The evaluation system may also determine the RPN based on a severity that is based on whether a systematic failure in the software under evaluation may compromise the function provided by the software. The severity may also be normalized to a discrete value range (e.g., within the same range as for the occurrence values), where a low value (e.g., 1) indicates a failure will not compromise the function provided by the software and a high value (e.g., 10) indicates a failure will compromise the function provided by the software. The evaluation system may also determine the RPN based on a detectability value that is based on whether there are measures external to the software for detecting the presence of a failure or correcting for it. The evaluation system may also normalize the detectability value to a discrete value range (e.g., within the same range as for the occurrence values), where a low value (e.g., 1) indicates the failure is detectable and a high value (e.g., 10) indicates a failure is not detectable.

Figure 4:
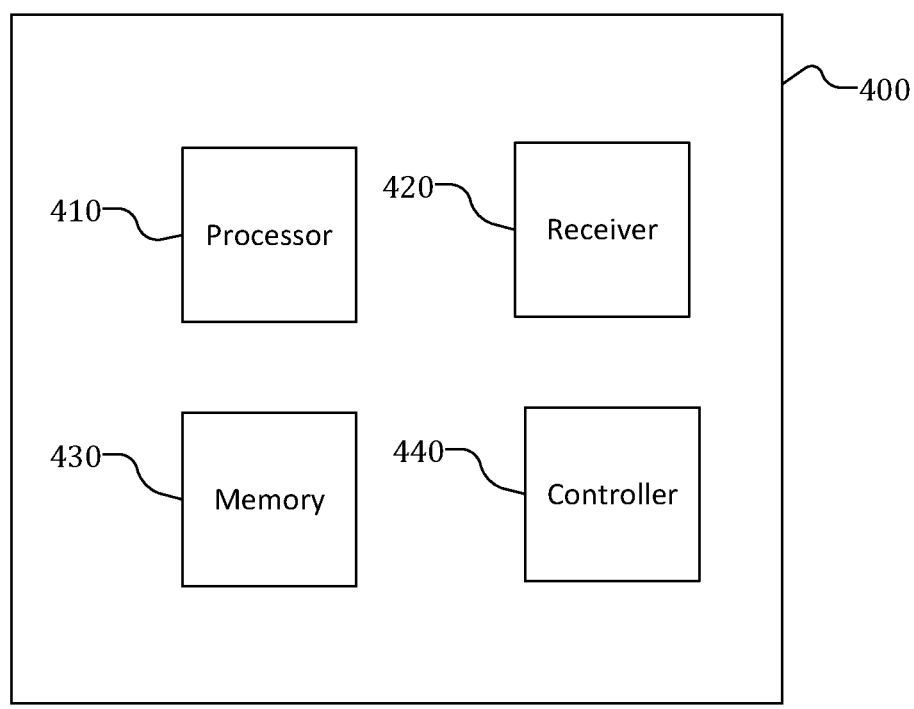
FIG. 4 illustrates an exemplary schematic drawing of a device for evaluating the functional safety of software that may be used in a vehicle.

FIG. 4 shows an example of device 400 that may evaluate functional safety compliance for a software program against a plurality of requirements. Without limitation, the evaluation system 400 may implement any, some, and/or all of the features described above with respect to evaluation system 100, evaluation system 200, and/or FIGS. 1-3. FIG. 4 may be implemented as a device, a system, a method, and/or a computer readable medium that, when executed, performs any of the features of the evaluation systems (e.g., evaluation system 100 and/or evaluation system 200) described above. It should be appreciated that evaluation system 400 is merely exemplary, and this example is not intended to limit any part of evaluation system 100 or evaluation system 200.

Device 400 may be a device for evaluating functional safety compliance for a software program against a plurality of requirements. Device 400 may include a processor 410 configured to determine a plurality of implementation values for developing the software program, where each implementation value of the plurality of implementation values is associated with a corresponding requirement of the plurality of requirements and is determined based on a level of compliance of the software program to the corresponding requirement. In addition to or in combination with any of the features described in this or the following paragraphs, processor 410 is also configured to determine a risk priority number for the software program based on an aggregation of the plurality of implementation values. In addition to or in combination with any of the features described in this or the following paragraphs, processor 410 is also configured to determine a safety score for the software program based on whether the risk priority number satisfies a predefined threshold.

Furthermore, in addition to or in combination with any one of the features of this and/or the preceding paragraph with respect to device 400, the plurality of requirements may include normative requirements for complying with a safety integrity level (SIL) target or of an automotive safety integrity level (ASIL) target. Furthermore, in addition to or in combination with any one of the features of this and/or the preceding paragraph with respect to device 400, the level of compliance may include a weighting that is based on an extent to which the corresponding requirement is recommended for achieving a target safety integrity level associated with the predefined threshold. Furthermore, in addition to or in combination with any one of the features of this and/or the preceding paragraph with respect to device 400, the level of compliance may include a criticality weight to which the corresponding requirement pertains. Furthermore, in addition to or in combination with any one of the features of this and/or the preceding paragraph with respect to device 400, the criticality weight may be based on a development phase to which the corresponding requirement pertains.

Furthermore, in addition to or in combination with any one of the features of this and/or the preceding two paragraphs, device 400 may further include a receiver 420 configured to receive documentation about the software program, wherein the documentation describes a development process of the software program with respect to the plurality of requirements. Furthermore, in addition to or in combination with any one of the features of this and/or the preceding two paragraphs, receiver 420 may be configured to receive the documentation from a vehicle configured to operate the software program. Furthermore, in addition to or in combination with any one of the features of this and/or the preceding two paragraphs with respect to device 400, the documentation includes at least one of a test report, a code coverage, a traceability matrix, or a design document. Furthermore, in addition to or in combination with any one of the features of this and/or the preceding two paragraphs, device 400 may further include a memory 430 to store the safety score for the software program.

Furthermore, in addition to or in combination with any one of the features of this and/or the preceding three paragraphs, device 400 may further include a controller 440 configured to generate an instruction for adjusting an operational parameter of a vehicle based on the safety score. Furthermore, in addition to or in combination with any one of the features of this and/or the preceding three paragraphs with respect to device 400, the risk priority number may be further based on a severity value associated with a failure mode of the software program. Furthermore, in addition to or in combination with any one of the features of this and/or the preceding three paragraphs with respect to device 400, the severity value may indicate whether a failure mode of the software program impacts a safety function provided by the software program. Furthermore, in addition to or in combination with any one of the features of this and/or the preceding three paragraphs with respect to device 400, the severity value may include a number between a first severity value and a second severity value, wherein the first severity value indicates that the failure mode does not impact the safety function provided by the software program, and wherein the second severity value indicates that the failure mode does impact the safety function provided by the software program.

Furthermore, in addition to or in combination with any one of the features of this and/or the preceding four paragraphs with respect to device 400, wherein the risk priority number may be further based on a detectability value associated with a failure mode of the software program. Furthermore, in addition to or in combination with any one of the features of this and/or the preceding four paragraphs with respect to device 400, wherein the detectability value may indicate whether a diagnostic measure exists for detecting the failure mode. Furthermore, in addition to or in combination with any one of the features of this and/or the preceding four paragraphs with respect to device 400, wherein the detectability value may include a number between a first detectability value and a second detectability value, wherein the first detectability value indicates that the diagnostic measure exists, and wherein the second detectability value indicates that the diagnostic measure does not exist.

Furthermore, in addition to or in combination with any one of the features of this and/or the preceding five paragraphs with respect to device 400, wherein the software program may include a decomposition schema or a combination schema of a first software element and a second software element, wherein the detectability value may include a decomposed detectability value based on the predefined threshold and the aggregation of the plurality of implementation values for the first software element and/or based on the predefined threshold and the aggregation of the plurality of implementation values for the second software element. Furthermore, in addition to or in combination with any one of the features of this and/or the preceding five paragraphs with respect to device 400, the first software element may have a first detectability value and the second software element may have a second detectability value, wherein the decomposed detectability value may improve either the first detectability value and/or the second detectability value. Furthermore, in addition to or in combination with any one of the features of this and/or the preceding five paragraphs with respect to device 400, wherein the first software element may have a first detectability value and the second software element may have a second detectability value, wherein the decomposed detectability value may include the minimum between the first detectability value and the predefined threshold divided by a first divisor including the aggregation of the plurality of implementation values for the first software element multiplied by a severity associated with a failure mode of the software program and/or the minimum between the second detectability value and the predefined threshold divided by a second divisor including the aggregation of the plurality of implementation values for the second software element multiplied by the severity.

Furthermore, in addition to or in combination with any one of the features of this and/or the preceding six paragraphs with respect to device 400, wherein the aggregation may include a sum of the implementation values associated with each of the plurality of requirements. Furthermore, in addition to or in combination with any one of the features of this and/or the preceding six paragraphs with respect to device 400, wherein the predefined threshold may include one of a plurality of predefined thresholds, wherein each predefined threshold is associated with a corresponding safety level of a plurality of safety levels, wherein the processor 510 may be configured to determine the safety score from among the plurality of safety levels based on which of the plurality of predefined thresholds the risk priority number satisfies. Furthermore, in addition to or in combination with any one of the features of this and/or the preceding six paragraphs with respect to device 400, wherein the plurality of safety levels may include a plurality of SIL target levels or a plurality of ASIL target levels.

Figure 5:
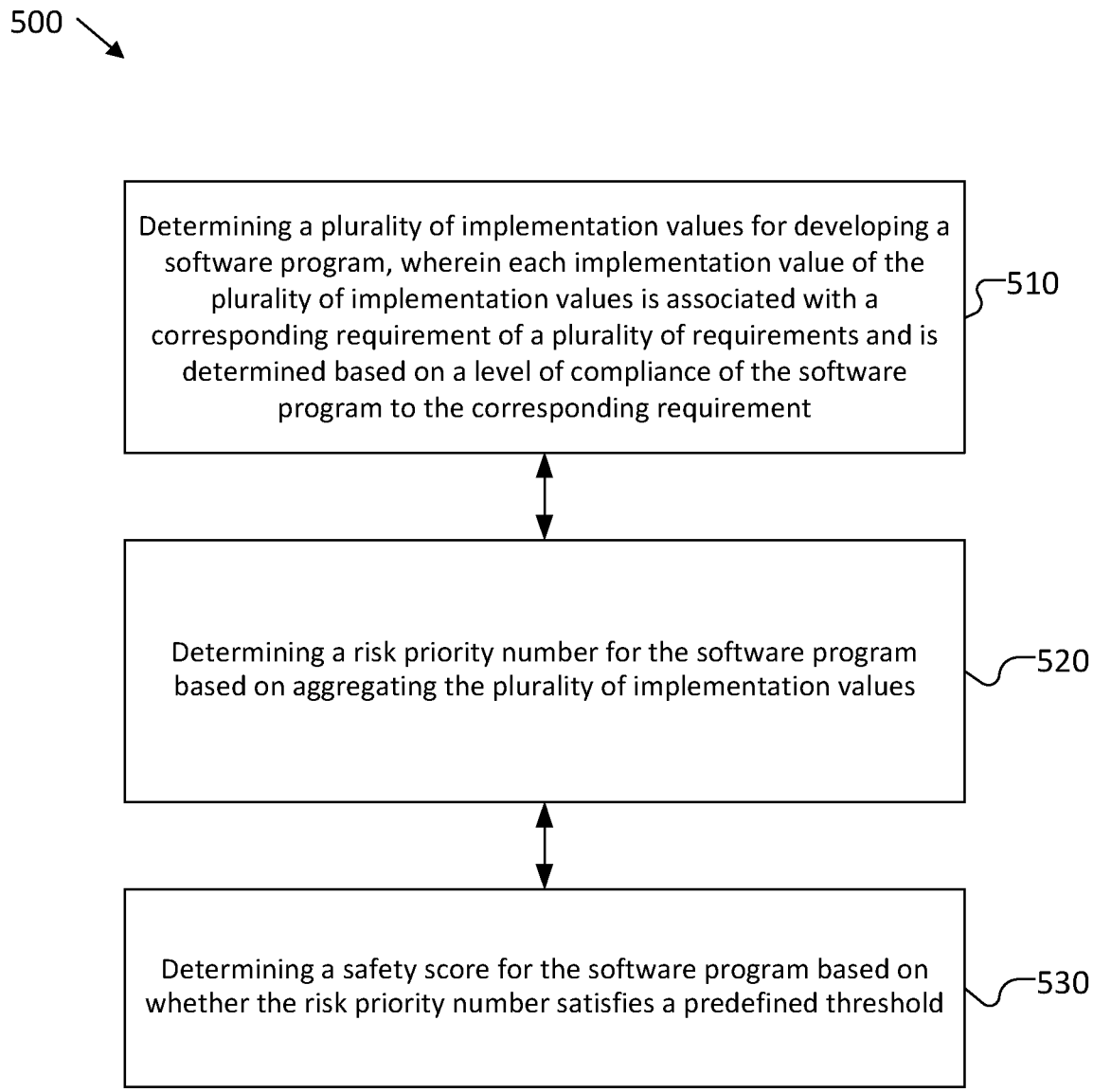
FIG. 5 depicts a schematic flow diagram of an exemplary method for evaluating the functional safety of software that may be used in a vehicle.

FIG. 5 depicts a schematic flow diagram of a method 500 for evaluating functional safety compliance for a software program against a plurality of requirements. Method 500 may implement any of the features discussed above with respect to evaluation system 100, evaluation system 200, device 400, and/or FIGS. 1-4).

Method 500 includes, in 510, determining a plurality of implementation values for developing the software program. Each implementation value of the plurality of implementation values is associated with a corresponding requirement of the plurality of requirements and is determined based on a level of compliance of the software program to the corresponding requirement. The method 500 also includes, in 520, determining a risk priority number for the software program based on aggregating the plurality of implementation values. The method 500 also includes, in 530, determining a safety score for the software program based on whether the risk priority number satisfies a predefined threshold.

In the following, various examples are provided that may include one or more aspects described above with reference to features of the disclosed evaluation system (e.g., with respect to evaluation system 100, evaluation system 200, device 400, method 500, and/or FIGS. 1-5). The examples provided in relation to the devices may apply also to the described method(s), and vice versa.

Example 1 is a device for evaluating functional safety compliance for a software program against a plurality of requirements, wherein the device includes a processor configured to determine a plurality of implementation values for developing the software program. Each implementation value of the plurality of implementation values is associated with a corresponding requirement of the plurality of requirements and is determined based on a level of compliance of the software program to the corresponding requirement. The processor is also configured to determine a risk priority number for the software program based on an aggregation of the plurality of implementation values. The processor is also configured to determine a safety score for the software program based on whether the risk priority number satisfies a predefined threshold.

Example 2 is the device of example 1, wherein the plurality of requirements includes normative requirements for complying with a safety integrity level (SIL) target or of an automotive safety integrity level (ASIL) target.

Example 3 is the device of either of examples 1 or 2, wherein the level of compliance includes a weighting that is based on an extent to which the corresponding requirement is recommended for achieving a target safety integrity level associated with the predefined threshold.

Example 4 is the device of any one of examples 1 to 3, wherein the level of compliance includes a criticality weight to which the corresponding requirement pertains.

Example 5 is the device of example 4, wherein the criticality weight is based on a development phase to which the corresponding requirement pertains.

Example 6 is the device of any one of examples 1 to 5, the device further including a receiver configured to receive documentation about the software program, wherein the documentation describes a development process of the software program with respect to the plurality of requirements.

Example 7 is the device of example 6, wherein the receiver is configured to receive the documentation from a vehicle configured to operate the software program.

Example 8 is the device of example 7, wherein the documentation includes at least one of a test report, a code coverage, a traceability matrix, or a design document.

Example 9 is the device of any one of examples 1 to 8, further including a memory to store the safety score for the software program.

Example 10 is the device of any one of examples 1 to 9, the device further including a controller configured to generate an instruction for adjusting an operational parameter of a vehicle based on the safety score.

Example 11 is the device of any one of examples 1 to 10, wherein the risk priority number is further based on a severity value associated with a failure mode of the software program.

Example 12 is the device of example 11, wherein the severity value indicates whether the failure mode impacts a safety function provided by the software program.

Example 13 is the device of example 12, wherein the severity value includes a number between a first severity value and a second severity value, wherein the first severity value indicates that the failure mode does not impact the safety function provided by the software program, and wherein the second severity value indicates that the failure mode does impact the safety function provided by the software program.

Example 14 is the device of any one of examples 1 to 13, wherein the risk priority number is further based on a detectability value associated with a failure mode of the software program.

Example 15 is the device of example 14, wherein the detectability value indicates whether a diagnostic measure exists for detecting the failure mode of the software program.

Example 16 is the device of example 15, wherein the detectability value includes a number between a first detectability value and a second detectability value, wherein the first detectability value indicates that the diagnostic measure exists, and wherein the second detectability value indicates that the diagnostic measure does not exist.

Example 17 is the device of any one of examples 14 to 16, wherein the software program includes a decomposition schema or a combination schema of a first software element and a second software element, wherein the detectability value includes a decomposed detectability value based on the predefined threshold and the aggregation of the plurality of implementation values for the first software element and/or based on the predefined threshold and the aggregation of the plurality of implementation values for the second software element.

Example 18 is the device of example 17, wherein the first software element has a first detectability value and the second software element has a second detectability value, wherein the decomposed detectability value improves either the first detectability value and/or the second detectability value.

Example 19 is the device of either of examples 17 or 18, wherein the first software element has a first detectability value and the second software element has a second detectability value, wherein the decomposed detectability value includes the minimum between the first detectability value and the predefined threshold divided by a first divisor including the aggregation of the plurality of implementation values for the first software element multiplied by a severity associated with a failure mode of the software program and/or the minimum between the second detectability value and the predefined threshold divided by a second divisor including the aggregation of the plurality of implementation values for the second software element multiplied by the severity.

Example 20 is the device of any one of examples 15 to 19, wherein the diagnostic measure is external to the software program.

Example 21 is the device of any one of examples 1 to 20, wherein the aggregation includes a sum of the implementation values associated with each of the plurality of requirements.

Example 22 is the device of any one of examples 1 to 21, wherein the predefined threshold includes one of a plurality of predefined thresholds, wherein each predefined threshold is associated with a corresponding safety level of a plurality of safety levels, wherein the processor is configured to determine the safety score from among the plurality of safety levels based on which of the plurality of predefined thresholds the risk priority number satisfies.

Example 23 is the device of example 22, wherein the plurality of safety levels includes a plurality of SIL target levels or a plurality of ASIL target levels.

Example 24 is a method for evaluating functional safety compliance for a software program against a plurality of requirements, wherein the method includes determining a plurality of implementation values for developing the software program. Each implementation value of the plurality of implementation values is associated with a corresponding requirement of the plurality of requirements and is determined based on a level of compliance of the software program to the corresponding requirement. The method also includes determining a risk priority number for the software program based on aggregating the plurality of implementation values. The method also includes determining a safety score for the software program based on whether the risk priority number satisfies a predefined threshold.

Example 25 is the method of example 24, wherein the plurality of requirements includes normative requirements for complying with a safety integrity level (SIL) target or of an automotive safety integrity level (ASIL) target.

Example 26 is the method of either of examples 24 or 25, wherein the level of compliance includes a weighting that is based on an extent to which the corresponding requirement is recommended for achieving a target safety integrity level associated with the predefined threshold.

Example 27 is the method of any one of examples 24 to 26, wherein the level of compliance includes a criticality weight to which the corresponding requirement pertains.

Example 28 is the method of example 27, wherein the criticality weight is based on a development phase to which the corresponding requirement pertains.

Example 29 is the method of any one of examples 24 to 28, the method further including receiving documentation about the software program, wherein the documentation describes a development process of the software program with respect to the plurality of requirements.

Example 30 is the method of example 29, wherein receiving the documentation includes receiving the documentation from a vehicle configured to operate the software program.

Example 31 is the method of example 30, wherein the documentation includes at least one of a test report, a code coverage, a traceability matrix, or a design document.

Example 32 is the method of any one of examples 24 to 31, the method further including storing the safety score for the software program.

Example 33 is the method of any one of examples 24 to 32, the method further including generating an instruction for adjusting an operational parameter of a vehicle based on the safety score.

Example 34 is the method of any one of examples 24 to 33, wherein the risk priority number is further based on a severity value associated with a failure mode of the software program.

Example 35 is the method of example 34, wherein the severity value indicates whether the failure mode impacts a safety function provided by the software program.

Example 36 is the method of example 35, wherein the severity value includes a number between a first severity value and a second severity value, wherein the first severity value indicates that the failure mode does not impact the safety function provided by the software program, and wherein the second severity value indicates that the failure mode does impact the safety function provided by the software program.

Example 37 is the method of any one of examples 24 to 36, wherein the risk priority number is further based on a detectability value associated with a failure mode of the software program.

Example 38 is the method of example 37, wherein the detectability value indicates whether a diagnostic measure exists for detecting the failure mode of the software program.

Example 39 is the method of example 38, wherein the detectability value includes a number between a first detectability value and a second detectability value, wherein the first detectability value indicates that the diagnostic measure exists, and wherein the second detectability value indicates that the diagnostic measure does not exist.

Example 40 is the method of any one of examples 37 to 39, wherein the software program includes a decomposition schema or a combination schema of a first software element and a second software element, wherein the detectability value includes a decomposed detectability value based on the predefined threshold and the aggregation of the plurality of implementation values for the first software element and/or based on the predefined threshold and the aggregation of the plurality of implementation values for the second software element.

Example 41 is the method of example 40, wherein the first software element has a first detectability value and the second software element has a second detectability value, wherein the decomposed detectability value improves either the first detectability value and/or the second detectability value.

Example 42 is the method of either of examples 40 or 41, wherein the first software element has a first detectability value and the second software element has a second detectability value, wherein the decomposed detectability value includes the minimum between the first detectability value and the predefined threshold divided by a first divisor including the aggregation of the plurality of implementation values for the first software element multiplied by a severity associated with a failure mode of the software program and/or the minimum between the second detectability value and the predefined threshold divided by a second divisor including the aggregation of the plurality of implementation values for the second software element multiplied by the severity.

Example 43 is the method of any one of examples 38 to 42, wherein the diagnostic measure is external to the software program.

Example 44 is the method of any one of examples 24 to 43, wherein the aggregating includes summing the implementation values associated with each of the plurality of requirements.

Example 45 is the method of any one of examples 24 to 44, wherein the predefined threshold includes one of a plurality of predefined thresholds, wherein each predefined threshold is associated with a corresponding safety level of a plurality of safety levels, wherein the method further includes determining the safety score from among the plurality of safety levels based on which of the plurality of predefined thresholds the risk priority number satisfies.

Example 46 is the method of example 45, wherein the plurality of safety levels includes a plurality of SIL target levels or a plurality of ASIL target levels.

Example 47 is an apparatus for evaluating functional safety compliance for a software program against a plurality of requirements, wherein the apparatus includes a means for determining a plurality of implementation values for developing the software program. Each implementation value of the plurality of implementation values is associated with a corresponding requirement of the plurality of requirements and is determined based on a level of compliance of the software program to the corresponding requirement. The apparatus also includes a means for determining a risk priority number for the software program based on an aggregation of the plurality of implementation values. The apparatus also includes a means for determining a safety score for the software program based on whether the risk priority number satisfies a predefined threshold.

Example 48 is the apparatus of example 47, wherein the plurality of requirements includes normative requirements for complying with a safety integrity level (SIL) target or of an automotive safety integrity level (ASIL) target.

Example 49 is the apparatus of either of examples 47 or 48, wherein the level of compliance includes a weighting that is based on an extent to which the corresponding requirement is recommended for achieving a target safety integrity level associated with the predefined threshold.

Example 50 is the apparatus of any one of examples 47 to 49, wherein the level of compliance includes a criticality weight to which the corresponding requirement pertains.

Example 51 is the apparatus of example 50, wherein the criticality weight is based on a development phase to which the corresponding requirement pertains.

Example 52 is the apparatus of any one of examples 47 to 51, the apparatus further including a means for receiving documentation about the software program, wherein the documentation describes a development process of the software program with respect to the plurality of requirements.

Example 53 is the apparatus of example 52, wherein the means for receiving further includes a means for receiving the documentation from a vehicle configured to operate the software program.

Example 54 is the apparatus of example 53, wherein the documentation includes at least one of a test report, a code coverage, a traceability matrix, or a design document.

Example 55 is the apparatus of any one of examples 47 to 54, further including a means for storing the safety score for the software program.

Example 56 is the apparatus of any one of examples 47 to 55, the apparatus further including a means for generating a control instruction for adjusting an operational parameter of a vehicle based on the safety score.

Example 57 is the apparatus of any one of examples 47 to 56, wherein the risk priority number is further based on a severity value associated with a failure mode of the software program.

Example 58 is the apparatus of example 57, wherein the severity value indicates whether the failure mode impacts a safety function provided by the software program.

Example 59 is the apparatus of example 58, wherein the severity value includes a number between a first severity value and a second severity value, wherein the first severity value indicates that the failure mode does not impact the safety function provided by the software program, and wherein the second severity value indicates that the failure mode does impact the safety function provided by the software program.

Example 60 is the apparatus of any one of examples 47 to 59, wherein the risk priority number is further based on a detectability value associated with a failure mode of the software program.

Example 61 is the apparatus of example 60, wherein the detectability value indicates whether a diagnostic measure exists for detecting a failure mode of the software program.

Example 62 is the apparatus of example 61, wherein the detectability value includes a number between a first detectability value and a second detectability value, wherein the first detectability value indicates that the diagnostic measure exists, and wherein the second detectability value indicates that the software program does not exist.

Example 63 is the apparatus of any one of examples 60 to 62, wherein the software program includes a decomposition schema or a combination schema of a first software element and a second software element, wherein the detectability value includes a decomposed detectability value based on the predefined threshold and the aggregation of the plurality of implementation values for the first software element and/or based on the predefined threshold and the aggregation of the plurality of implementation values for the second software element.

Example 64 is the apparatus of example 63, wherein the first software element has a first detectability value and the second software element has a second detectability value, wherein the decomposed detectability value improves either the first detectability value and/or the second detectability value.

Example 65 is the apparatus of either of examples 63 or 64, wherein the first software element has a first detectability value and the second software element has a second detectability value, wherein the decomposed detectability value includes the minimum between the first detectability value and the predefined threshold divided by a first divisor including the aggregation of the plurality of implementation values for the first software element multiplied by a severity associated with a failure mode of the software program and/or the minimum between the second detectability value and the predefined threshold divided by a second divisor including the aggregation of the plurality of implementation values for the second software element multiplied by the severity.

Example 66 is the apparatus of any one of examples 61 to 65, wherein the diagnostic measure is external to the software program.

Example 67 is the apparatus of any one of examples 47 to 66, wherein the aggregation includes a sum of the implementation values associated with each of the plurality of requirements.

Example 68 is the apparatus of any one of examples 47 to 67, wherein the predefined threshold includes one of a plurality of predefined thresholds, wherein each predefined threshold is associated with a corresponding safety level of a plurality of safety levels, wherein the apparatus further includes a means for determining the safety score from among the plurality of safety levels based on which of the plurality of predefined thresholds the risk priority number satisfies.

Example 69 is the apparatus of example 68, wherein the plurality of safety levels includes a plurality of SIL target levels or a plurality of ASIL target levels.

Example 70 is a non-transitory computer readable medium for evaluating functional safety compliance for a software program against a plurality of requirements, wherein the non-transitory computer readable medium includes instructions which, if executed, cause one or more processors to determine a plurality of implementation values for developing the software program. Each implementation value of the plurality of implementation values is associated with a corresponding requirement of the plurality of requirements and is determined based on a level of compliance of the software program to the corresponding requirement. The instructions also cause the one or more processors to determine a risk priority number for the software program based on an aggregation of the plurality of implementation values. The instructions also cause the one or more processors to determine a safety score for the software program based on whether the risk priority number satisfies a predefined threshold.

Example 71 is the non-transitory computer readable medium of example 70, wherein the plurality of requirements includes normative requirements for complying with a safety integrity level (SIL) target or of an automotive safety integrity level (ASIL) target.

Example 72 is the non-transitory computer readable medium of either of examples 70 or 71, wherein the level of compliance includes a weighting that is based on an extent to which the corresponding requirement is recommended for achieving a target safety integrity level associated with the predefined threshold.

Example 73 is the non-transitory computer readable medium of any one of examples 70 to 72, wherein the level of compliance includes a criticality weight to which the corresponding requirement pertains.

Example 74 is the non-transitory computer readable medium of example 73, wherein the criticality weight is based on a development phase to which the corresponding requirement pertains.

Example 75 is the non-transitory computer readable medium of any one of examples 70 to 74, wherein instructions also cause the one or more processors to receive documentation about the software program, wherein the documentation describes a development process of the software program with respect to the plurality of requirements.

Example 76 is the non-transitory computer readable medium of example 75, wherein instructions also cause the one or more processors to receive via a receiver the documentation from a vehicle configured to operate the software program.

Example 77 is the non-transitory computer readable medium of example 76, wherein the documentation includes at least one of a test report, a code coverage, a traceability matrix, or a design document.

Example 78 is the non-transitory computer readable medium of any one of examples 70 to 77, wherein instructions also cause the one or more processors to store in a memory the safety score for the software program.

Example 79 is the non-transitory computer readable medium of any one of examples 70 to 78, instructions also cause the one or more processors to generate an instruction for adjusting an operational parameter of a vehicle based on the safety score.

Example 80 is the non-transitory computer readable medium of any one of examples 70 to 79, wherein the risk priority number is further based on a severity value associated with a failure mode of the software program.

Example 81 is the non-transitory computer readable medium of example 80, wherein the severity value indicates whether the failure mode impacts a safety function provided by the software program.

Example 82 is the non-transitory computer readable medium of example 81, wherein the severity value includes a number between a first severity value and a second severity value, wherein the first severity value indicates that the failure mode does not impact the safety function provided by the software program, and wherein the second severity value indicates that the failure mode does impact the safety function provided by the software program.

Example 83 is the non-transitory computer readable medium of any one of examples 70 to 82, wherein the risk priority number is further based on a detectability value associated with a failure mode of the software program.

Example 84 is the non-transitory computer readable medium of example 83, wherein the detectability value indicates whether a diagnostic measure exists for detecting the failure mode of the software program.

Example 85 is the non-transitory computer readable medium of example 84, wherein the detectability value includes a number between a first detectability value and a second detectability value, wherein the first detectability value indicates that the diagnostic measure exists, and wherein the second detectability value indicates that the diagnostic measure does not exist.

Example 86 is the non-transitory computer readable medium of any one of examples 83 to 85, wherein the software program includes a decomposition schema or a combination schema of a first software element and a second software element, wherein the detectability value includes a decomposed detectability value based on the predefined threshold and the aggregation of the plurality of implementation values for the first software element and/or based on the predefined threshold and the aggregation of the plurality of implementation values for the second software element.

Example 87 is the non-transitory computer readable medium of example 86, wherein the first software element has a first detectability value and the second software element has a second detectability value, wherein the decomposed detectability value improves either the first detectability value and/or the second detectability value.

Example 88 is the non-transitory computer readable medium of either of examples 86 or 87, wherein the first software element has a first detectability value and the second software element has a second detectability value, wherein the decomposed detectability value includes the minimum between the first detectability value and the predefined threshold divided by a first divisor including the aggregation of the plurality of implementation values for the first software element multiplied by a severity associated with a failure mode of the software program and/or the minimum between the second detectability value and the predefined threshold divided by a second divisor including the aggregation of the plurality of implementation values for the second software element multiplied by the severity.

Example 89 is the non-transitory computer readable medium of any one of examples 84 to 88, wherein the diagnostic measure is external to the software program.

Example 90 is the non-transitory computer readable medium of any one of examples 70 to 89, wherein the aggregation includes a sum of the implementation values associated with each of the plurality of requirements.

Example 91 is the non-transitory computer readable medium of any one of examples 70 to 90, wherein the predefined threshold includes one of a plurality of predefined thresholds, wherein each predefined threshold is associated with a corresponding safety level of a plurality of safety levels, wherein the instructions also cause the one or more processors to determine the safety score from among the plurality of safety levels based on which of the plurality of predefined thresholds the risk priority number satisfies.

Example 92 is the non-transitory computer readable medium of example 91, wherein the plurality of safety levels includes a plurality of SIL target levels or a plurality of ASIL target levels.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

The invention claimed is:

1. A device for evaluating functional safety compliance for a software program against a plurality of requirements, the device comprising:
   a processor configured to:
   determine a plurality of implementation values for developing the software program, wherein each implementation value of the plurality of implementation values is associated with a corresponding requirement of the plurality of requirements, wherein each implementation value is determined based on a level of compliance of the software program to the corresponding requirement;
determine a risk priority number for the software program based on an aggregation of the plurality of implementation values; and
determine a safety score for the software program based on whether the risk priority number satisfies a predefined threshold; and
a controller configured to generate an instruction for adjusting an operational parameter of a vehicle based on the safety score.

2. The device of claim 1, wherein the plurality of requirements comprises normative requirements for complying with a safety integrity level target or of an automotive safety integrity level target.

3. The device of claim 1, wherein the level of compliance comprises a weighting that is based on an extent to which the corresponding requirement is recommended for achieving a target safety integrity level associated with the predefined threshold.

4. The device of claim 1, wherein the level of compliance comprises a criticality weight to which the corresponding requirement pertains.

5. The device of claim 4, wherein the criticality weight is based on a development phase to which the corresponding requirement pertains.

6. The device of claim 1, the device further comprising a receiver configured to receive documentation about the software program, wherein the documentation describes a development process of the software program with respect to the plurality of requirements.

7. The device of claim 6, wherein the receiver is configured to receive the documentation from a vehicle configured to operate the software program.

8. The device of claim 6, wherein the documentation comprises at least one of a test report, a code coverage, a traceability matrix, or a design document.

9. The device of claim 1, wherein the instruction comprises a modified driving profile that is based on the safety score, wherein the modified driving profile comprises an adjusted maximum allowed speed or an adjusted maximum allowed acceleration.

10. The device of claim 1, wherein the risk priority number is further based on a severity value associated with a failure mode of the software program, wherein the severity value indicates whether the failure mode impacts a safety function provided by the software program.

11. The device of claim 10, wherein the severity value comprises a number between a first severity value and a second severity value, wherein the first severity value indicates that the failure mode does not impact the safety function provided by the software program, and wherein the second severity value indicates that the failure mode does impact the safety function provided by the software program.

12. The device of claim 1, wherein the risk priority number is further based on a detectability value associated with a failure mode of the software program, wherein the detectability value indicates whether a diagnostic measure exists for detecting the failure mode.

13. The device of claim 12, wherein the detectability value comprises a number between a first detectability value and a second detectability value, wherein the first detectability value indicates that the diagnostic measure exists, and wherein the second detectability value indicates that the diagnostic measure does not exist.

14. The device of claim 12, wherein the software program comprises a decomposition schema or a combination schema of a first software element and a second software element, wherein the detectability value comprises a decomposed detectability value
based on the predefined threshold and the aggregation of the plurality of implementation values for the first software element and/or
based on the predefined threshold and the aggregation of the plurality of implementation values for the second software element.

15. The device of claim 14, wherein the first software element has a first detectability value and the second software element has a second detectability value, wherein the decomposed detectability value improves either the first detectability value and/or the second detectability value.

16. The device of claim 14, wherein the first software element has a first detectability value and the second software element has a second detectability value, wherein the decomposed detectability value comprises:
the minimum between the first detectability value and the predefined threshold divided by a first divisor comprising the aggregation of the plurality of implementation values for the first software element multiplied by a severity associated with a failure mode of the software program; and/or
the minimum between the second detectability value and the predefined threshold divided by a second divisor comprising the aggregation of the plurality of implementation values for the second software element multiplied by the severity.

17. The device of claim 1, the device further comprising a memory to store the safety score for the software program.

18. The device of claim 1, wherein the aggregation comprises a sum of the implementation values associated with each of the plurality of requirements.

19. The device of claim 1, wherein the predefined threshold comprises one of a plurality of predefined thresholds, wherein each predefined threshold is associated with a corresponding safety level of a plurality of safety levels, wherein the processor is configured to determine the safety score from among the plurality of safety levels based on which of the plurality of predefined thresholds the risk priority number satisfies.

20. The device of claim 19, wherein the plurality of safety levels comprises a plurality of safety integrity target levels or a plurality of automotive safety integrity target levels.

21. A non-transitory computer readable medium for evaluating functional safety compliance for a software program against a plurality of requirements, wherein the non-transitory computer readable medium includes instructions which, if executed, cause one or more processors to:
determine a plurality of implementation values for developing the software program, wherein each implementation value of the plurality of implementation values is associated with a corresponding requirement of the plurality of requirements and is determined based on a level of compliance of the software program to the corresponding requirement;
determine a risk priority number for the software program based on a severity value, a detectability value, and an aggregation of the plurality of implementation values;
determine a safety score for the software program based on whether the risk priority number satisfies a predefined threshold; and generate an instruction for adjusting an operational parameter of a vehicle based on the safety score.

22. The non-transitory computer readable medium of claim 21, wherein the severity value indicates whether a failure mode of the software program impacts a safety function provided by the software program and wherein the detectability value indicates whether a diagnostic measure exists for detecting the failure mode.

23. The non-transitory computer readable medium of claim 21, wherein the software program includes a decomposition schema or a combination schema of a first software element with a first detectability value and a second software element with a second detectability value, wherein the detectability value includes a decomposed detectability value based on:
- the minimum between the first detectability value and the predefined threshold divided by a first divisor including the aggregation of the plurality of implementation values for the first software element multiplied by a severity associated with a failure mode of the software program; and/or
- the minimum between the second detectability value and the predefined threshold divided by a second divisor including the aggregation of the plurality of implementation values for the second software element multiplied by the severity.

24. The non-transitory computer readable medium of claim 22, wherein the diagnostic measure is external to the software program.

* * * * *